United States Patent Office 3,595,821
Patented July 27, 1971

3,595,821
NEOPRENE BASED ADHESIVES
Sanford Spector, Cranford, Martin M. Grover, Upper Montclair, and Robert Glaser, Piscataway, N.J., assignors to PPG Industries, Inc., Pittsburgh, Pa.
No Drawing. Filed Mar. 30, 1967, Ser. No. 626,975
Int. Cl. C08g 5/22
U.S. Cl. 260—25                                    12 Claims

ABSTRACT OF THE DISCLOSURE

Neoprene-based adhesives comprising (1) three different types of chloroprene polymer, (2) an oil-soluble, heat-hardenable phenol-aldehyde resin, a reaction product of a terpene-phenol resin with such a phenol-aldehyde resin, and/or a metal resinate, and (3) an alkali metal or alkaline earth metal oxide or hydroxide. The three different types of chloroprene polymer include a reactive, vulcanizable neoprene; a low softening, high crystallizing neoprene; and a low softening, medium crystallizing neoprene. These adhesives have unique combination of high heat resistance, high immediate strength and long bonding range.

Adhesive compositions containing polymers of chloroprene (2-chloro-1,3-butadiene), commonly called neoprene, have been extensively employed for various purposes and for bonding various surfaces. For example, U.S. Pat. No. 2,610,910 relates to compositions in which polymerized chloroprene is combined with phenolic resin, and U.S. Pat. No. 2,918,442 relates to similar adhesives also containing magnesium oxide. U.S. Pat. No. 2,401,015 describes adhesives in which a chloroprene polymer is combined with zinc resinate.

These adhesive cements, while suitable for many purposes, have certain shortcomings. The properties which are considered to be important in neoprene-based adhesive cements include a long bonding range, which means that there is a relatively long period after the adhesive is dry during which adhesive coated members can be successfully joined; suitable heat resistance, which refers to the ability of the bonded assembly to withstand elevated temperatures without lifting or deformation; and high immediate strength, which permits the bonded assembly to be handled and utilized within a reasonable time. Ordinary adhesives of this type are usually deficient in one or more of these properties. For instance, where sufficient heat resistance is attained, the cements are deficient in bonding range, that is, the time after drying during which they can be pressed together and still form a suitable bond is too short for practical production applications. When the adhesive is formulated so as to lengthen the bonding range, the adhesive bond generally lacks sufficient rigidity, resulting in low initial strength and low shear strength, especially at elevated temperatures.

Because the optimum combination of properties has not been attainable the utility of neoprene cements has been limited, and it has been necessary to most cases to formulate a specific adhesive where a particular use is intended. Even in these cases, a compromise in the properties attained has usually been necessary, especially where the intended use requires that the adhesive provide a high level of performance.

It has now been found that neoprene-based cements in which the chloroprene polymer component is a mixture of three separate types of neoprene have a unique combination of the above-mentioned properties. Surprisingly, these adhesives exhibit an excellent level of performance in each respect, without the disadvantages normally associated with such adhesives in which the obtention of the properties of one type is at the expense of other properties. On the contrary, the adhesives herein provide both good heat resistance and high immediate strength, along with a long bonding range.

The neoprene or chloroprene polymers employed in this invention are polychloroprene or equivalent copolymers of chloroprene with small amounts of other monomers, such as other dienes, acrylonitrile, methacrylic acid and the like, with the amount of comonomer usually being 20 percent or less. The mixture of chloroprene polymers employed herein consists of:

(a) From about 10 to about 70 percent by weight, and preferably from about 25 to about 50 percent by being of chloroprene polymer which is characterized by being vulcanized when treated with magnesium oxide;

(b) From about 5 to about 75 percent by weight, and preferably from about 20 to about 45 percent by weight, of chloroprene polymer having a low softening rate when treated with piperidinium pentamethylene thiocarbamate and a high crystallizing rate after such treatment, and (c) From about 10 to about 65 percent by weight, and preferably from about 15 to about 40 percent by weight, of chloroprene polymer having a low softening rate when treated with piperidinium pentamethylene thiocarbamate and a medium crystallizing rate after such treatment.

Chloroprene polymers are available commercially in each of the three types described above. Many of the available neoprenes are described in the book by Murray and Thompson, entitled "The Neoprenes," published by The Rubber Chemicals Division, E. I. du Pont de Nemours & Company. The various types of neoprenes mentioned herein, such as neoprene AC, neoprene AD, neoprene W, neoprene AF and others, follow the commercial designation of neoprenes in the above book and in the published bulletins of E. I. du Pont de Nemours & Co., such as that entitled "Processing and Compounding of Neoprene AF," by Lawrence and Fitch, dated November 1964.

The three different types of chloroprene polymers employed in the invention are all non-creping and can be characterized by their performance under certain test conditions. The first type of chloroprene polymer employed is a reactive neoprene which is characterized by being at least partially vulcanized when milled for 15 minutes at 212° F. (or higher) with five parts of magnesium oxide for each 100 parts of the chloroprene polymer. The vulcanization is evidenced by the fact that, after the treatment, a 20 percent by weight concentration of the chloroprene polymer in toluene forms a gel-like semi-solid structure. This characteristic behavior is indicative of a reactive type of polymer clearly different from the other chloroprene polymers known and employed in the art. A commercial neoprene polymer which exhibits this characteristic is known as neoprene AF.

The other types of chloroprene polymer employed include those which have a low softening rate when treated with piperidinium pentamethylene thiocarbamate, coupled with a high crystallizing rate after such treatment, and those which have a low softening rate and a medium crystallizing rate. For porpusse of characterizing chloroprene polymers in this respect, a definitive test easily adaptable to laboratory equipment is carried out as follows:

(1) A sample of 400 grams of chloroprene polymer is milled for two minutes at room temperature on a 12-inch two-roll rubber compounding mill at a 0.045 inch setting.

(2) The Mooney viscosity or plasticity number of the chloroprene polymer is determined using ASTM D-1646 for the Mooney viscosity, or ASTM D-926 to determine plasticity number.

(3) The chloroprene polymer is mixed with 0.5 part of piperidinium pentamethylene thiocarbamate per 100 parts of polymer and milled for five additional minutes.

(4) The Mooney viscosity or plasticity number is again determined and compared with the previous result. In order to be classified as a low softening polymer, the chloroprene polymer must show less than a 35 percent difference in viscosity or plasticity in the second sample.

(5) A piece of the milled polymer, 4 inches by one inch by one-half inch with a smooth surface is exposed at room temperature (about 25° C.) for five hours and the Shore A durometer hardness is then measured. If at this time the hardness is between 60 and 80, the polymer is considered to have a high crystallizing rate. If the hardness is between 20 and 30, the polymer is further tested as follows:

(6) A second sample is taken as in (5) and is warmed for fifteen minutes at 158° F., cooled for fifteen minutes at room temperature, and the Shore A durometer hardness measured. The sample is then exposed at 32° F. for six hours and the hardness measured once more. In order to be classified as a medium crystallizing polymer, the hardness should not increase more than about 20 points in the second sample.

As indicated, the second type of chloroprene polymer utilized in the invention includes the low-softening, high crystallizing polymers as characterized by the above test, and these are exemplified commercially by those known as neoprene AC and neoprene AD.

The third type of chloroprene polymer employed is the low-softening, medium-crystallizing type, of which commercial embodiments include neoprene W, neoprene WHV, neoprene WHV–100, and neoprene W–M1.

In the neoprene adhesives of the invention, the above-described mixture of chloroprene polymers is combined with one or more of the following resins:

(a) Oil soluble, heat-hardenable phenol-aldehyde resins;

(b) Reaction products of oil-soluble, heat-hardenable phenol-aldehyde resins with a terpene-phenol resin made from the reaction of a phenol with a terpene;

(c) Metal resinate.

A total of from about 10 to about 150 parts of the phenolic resin, the terpene-phenolic resin, and/or the metal resinate are used for each 100 parts of chloroprene polymer.

In addition to the chloroprene polymer and the above resin component,t the dahesive cements herein contain from about 0.5 to about 40 parts of at least one oxide or hydroxide of a metal from Groups I–A, II–A, II–B or IV–A of the Periodic Table, this again being based upon 100 parts of chloroprene polymer.

The oil-soluble, heat-hardenable phenol-aldehyde resins employed in these adhesives are made using reactant ratios, catalysts and polymerization conditions chosen to obtain products which are oil-soluble and heat-reactive. Such phenolaldehyde resins are well know in the art, and any phenolic resin having these properties can be employed herein. Ordinarily, a para-substituted phenol is employed, such as para-phenyl phenol, para-tertiary-amyl phenol, para-octyl phenol, or para-tertiary-butyl phenol. In some cases such resins may also contain other phenols or phenol itself, but resins produced from para-substituted phenols, and especially para-tertiary-butyl phenol, are usually preferred. The aldehyde condensed with the phenol is most often formaldehyde, although other aldehydes and aldehyde reagents, such as acetaldehyde, para-formaldehyde or hexamethylene-tetramine can also be employed. Usually the resin is made with an excess of aldehyde; typically between 1.5 and 2.0 moles of aldehyde per mole of the phenol are used. Alkaline catalysts are generally employed in producing the oil-soluble, heat-hardenable resins utilized herein.

There can also be employed in place of the above phenolic resin, or in conjunction therewith, reaction products of the above oil-soluble, heat-hardening phenol-aldehyde resins with a terpene-phenol condensation product. A number of such reaction products are described in U.S. Pat. No. 2,741,651. The manner in which such compounds are reacted with the phenol are described in the above patent, as in the procedure utilized in reacting the terpene-phenol resin with a heat-hardening, oil-soluble phenol-aldehyde resin. Various terpenic compounds can be employed; the preferred reaction products are those produced using rosin or abietic acid as the terpene.

In making the terpene-phenol condensation product, the rosin or other terpene is heated with a phenol. Phenol itself is preferred, but there may also be employed, at least in part, substituted phenols such as meta-cresol, or any other substituted phenol in which the substituents do not interfere with the desired condensation. A catalyst such as boron trifluoride, tin chloride, or a substituted sulfonic acid is usually present, and if desired, the terpene-phenol resin can be modified by the addition of a small amount of formaldehyde, maleic anhydride, or the like materials.

The further reaction product is then prepared by reacting the above rosin-phenol resin (or other terpene-phenol resin) with an oil-soluble, heat hardenable phenol-aldehyde resin such as those described above. This reaction is usually carried out at a temperature between about 90° C. and about 200° C. using varying proportions of reactants. For example, the use of from 1 to 9 parts by weight of the phenol-aldehyde resin to 1 part of the terpene-phenol resin gives products having desirable properties of solubility and compatibility for most purposes. When a molten mixture of these reactants is heated under average conditions, the reaction may be complete in as little as three minutes, but usually an inert organic solvent medium is employed and longer reaction periods are then desirable.

In a typical procedure, a preferred reaction product is produced from 8 parts of phenol-aldehyde resin made from the alkaline catalyzed reaction of para-tertiary-butyl phenol with excess formaldehyde, and 1 part of rosin-phenol resin. These reactants are dissolved in sufficient toluene to make the non-volatile resin solids content of the solution 70 percent, and then refluxed for 4 to 12 hours.

Useful adhesives are also obtained by utilizing a metal resinate along with the chloroprene polymer mixture. The resinous component of the adhesive can consist solely of the chloroprene polymers and the metal resinate or, as is more usually the case, the metal resinate is used in conjunction with a phenolic resin or a terpene-phenolic reaction product as described above. Metal resinates are usually made by reacting rosin with a metal oxide at elevated temperatures, whereby the metal is combined into the rosin. Several such resinates are known and can be employed, including zinc resinate, magnesium resinate and lead resinate; it is preferred to use zinc resinate, which is the most common metal resinate and is commercially available. The commercial forms of zinc resinate are proferably utilized, and these often contain a small proportion of combined calcium and generally have from about 3 to about 9 percent combined zinc by weight.

The other component of the adhesive is an oxide or hydroxide of a metal from Groups I–A, II–A, II–B or IV–A of the Periodic Table. (The Periodic Table referred to herein is the conventional table found, for instance, at pages 394 and 395 of the "Handbook of Chemistry and Physics," 38th edition, published by the Chemical Rubber Publishing Co.) Groups I–A and II–A compounds are usually preferred, and especially alkaline earth metal compounds are preferred because they are less alkaline and less water soluble than the alkali metal compounds. However, when using alkaline earth metal compounds, usually a somewhat larger amount is needed than in the case of the corresponding alkali metal compound. Magnesium oxide is the specific preferred compound, but magnesium hydroxide, calcium hydroxide, strontium hydroxide, barium hydroxide, barium oxide and strontium oxide are also useful. Similarly, the hydroxides of sodium, lithium and potassium are quite effective, as are the oxides of these metals, although these oxides do not provide the best results because they tend to be too highly reactive. Other metal oxides and hydroxides that can be used include the oxides and hydroxides of Group II–B metals, such as cadmium and zinc, and Group IV–A metals, such as lead. Since magnesium oxide is both the most desirable from an overall standpoint and is readily available, it is almost always used in formulating adhesives in accordance with the invention.

The adhesives herein can also contain plasticizing components, additional tackifiers, fillers, additives, and the like, and are usually dissolved in an organic solvent or solvent mixture. For this purpose, any of those organic solvents ordinarily employed in polychloroprene compositions can be used, such as for example, aromatic hydrocarbons, chlorinated hydrocarbons and blends containing aliphatic hydrocarbons, esters, ketones and the like.

The compositions are produced in any of several ways. Simple mixing is adequate if the components are thoroughly blended. The chloroprene polymers are conveniently mixed by milling them together. Usually, however, the phenolic resin or reaction product and the metal resinate are preacted with the magnesium oxide or other oxide or hydroxide, usually in the presence of a trace of water, and then the product is blended with the chloroprene polymers, along with suitable solvent and any other desired ingredients.

The adhesives thus produced are employed in the same manner and for the same purposes as are known neoprene-based adhesives, and provide highly advantageous results and the unique combination of desirable properties described above. Thus, these adhesives, which contain the above described three types of chloroprene polymers, are superior to corresponding adhesives employing any one of the types of neoprenes and also to adhesives containing any combination of two of these different neoprene types.

One use for the adhesives herein in which their advantageous properties make them highly desirable is in bonding decorative laminates to wood or similar substrates. Decorative laminates, such as that known commercially as "Formica," are composed of several plies of resin-impregnated paper. The interior plies are impregnated with a phenolic resin and the decorative surface plies are made with a melamine-formaldehyde resin. The laminate is made by pressing the preimpregnated layers at high temperatures and pressures, e.g. 325° F. and 1500 p.s.i. for 30 minutes.

Such laminates are commonly bonded to plywood or particle board, which is a board made by densifying a mixture of wood particles and a resin such as a urea-formaldehyde resin, using heat and pressure. The laminates, however, tend to be concave, especially under low humidity and heat, because they are dimensionally unstable due to the inherent hygroscopicity of the surface plies containing melamine-formaldehyde resin as compared to the interior plies. When bonded to a substrate this instability, which is manifested with changes in humidity and temperature, produces stresses which tend to lift the laminate from the substrate. Because of these stresses, the adhesive employed must have high cohesive strength as well as good contact properties, and must retain its strength under the conditions likely to be encountered. The adhesives described herein provide such properties to a degree not heretofore achieved.

The adhesives of the invention and their preferred uses will be further described in connection with the several examples below, which illustrate the outstanding properties of these products. However, these examples should not be construed so as to limit the invention to their details. All parts and percentages are by weight unless otherwise indicated.

EXAMPLE 1

The following were agitated with high speed stirring for 4 hours:

| | Parts by wt. |
|---|---|
| Phenolic resin [1] | 40 |
| Magnesium oxide (fine particles) | 4 |
| Water | 1 |
| Toluene | 43 |

[1] Made from the alkaline catalyzed reaction of p-t-butyl phenol with excess formaldehyde.

The following ingredients were added, with the chloroprene polymers and the magnesium and zinc oxides being first milled together for 10 minutes:

| | Parts by wt. |
|---|---|
| Neoprene AF [1] | 37.5 |
| Neoprene AC [2] | 37.5 |
| Neoprene W [3] | 25.0 |
| Magnesium oxide | 1 |
| Zinc oxide | 0.5 |
| Di-t-butyl p-cresol (antioxidant) | 1 |
| Hexane | 252 |
| Methyl ethyl ketone | 137 |
| Toluene | 116 |

[1] Chloroprene polymer vulcanized when milled with MgO at 212° F.
[2] Chloroprene polymer having a low softening rate and high crystallation rate.
[3] Chloroprene polymer of low softening, medium crystallizing type.

This mixture was blended in a churn type mixer for 24 hours. The product was a fluid, homogeneous adhesive having a total solids content of 21 percent and viscosity of 1000 centipoises.

The above adhesive had excellent properties, including a long bonding range, high heat resistance and a high degree of resistance to stress at low humidity. These properties were demonstrated by tests in which the adhesive was applied to samples of particle board and decorative laminate ("Formica"), using a roller and a spread rate of about 160 square feet of coated surface per gallon of adhesive. The adhesive layers were allowed to stand until dry by the "kraft paper test," in which the adhesive is touched with smooth kraft paper; the adhesive is considered dry when it no longer transfers to the paper. Samples containing the adhesive layers were then allowed to stand for an additional period (to indicate bonding range), and then pressed together with a hand roller. After assembly the bonded pieces were cut into 12-inch squares and subjected to the following tests:

Heat resistance

Samples of bonded laminates were made as above with some samples being bonded 4 hours after the adhesive was dry and some after 6 hours. They were then aged at room temperature, some for 24 hours and some for 7 days. Each was then heated with an infra-red lamp until the surface temperature was 140° F. and maintained at this temperature for two hours. Heat resistance was determined by measuring the extent to which the laminate lifts from the particle board at the edge of the panel, with lifting extending over 0.030 inch from the edge being considered unsatisfactory.

Low humidity test

Samples were made as above, with the adhesive being allowed to stand various times after it was dry in order to evaluate the bonding range. The bonded samples were aged for 20 hours and then placed in an atmosphere having a 10 percent relative humidity for 7 days. Lifting was then measured as above; to pass this test lifting must not extend for more than 0.025 inch from the edge.

For comparison, the above tests were also carried out using several adhesives made in the same manner as Example 1 but using chloroprene polymers as follows.

Control A:
   100 parts of neoprene W
Control B:
   100 parts of neoprene AC
Control C:
   100 parts of neoprene AF
Control D:
   75 parts of neoprene AC
   25 parts of neoprene W
Control E:
   75 parts of neoprene AF
   25 parts of neoprene W
Control F:
   50 parts of neoprene AF
   50 parts of neoprene AC The data are shown in Table I. The figures given are in thousandths of an inch of lift.

TABLE I

| Adhesive | Heat resistance | | | | Low humidity test | | | |
|---|---|---|---|---|---|---|---|---|
| | Aged 24 hours | | Aged 7 days | | | | | |
| | 4 hours[1] | 6 hours[1] | 4 hours[1] | 6 hours[1] | ²0 | ¹1 | ¹2 | ¹3 |
| Example 1 | 21 | 23 | 10 | 14 | 10 | 11 | 10 | 15 |
| Control A | | All over 1 inch | | | | All over ½ inch | | |
| Control B | | All over ⅛ inch | | | 18 | 15 | 20 | 22 |
| Control C | | No satisfactory bond | | | 16 | 24 | 32 | 32 |
| Control D | | All over ⅛ inch | | | | All over ⅛ inch | | |
| Control E | 0 | 16 | 5 | 5 | 10 | 17 | 19 | 41 |
| Control F | 32 | 60 | 12 | 12 | 0 | 35 | 5 | 0 |

[1] Time in hours before sample was bonded.
[2] Sample bonded immediately when dry.

As indicated by the data shown, the present adhesives unexpectedly provide a combination of properties not attainable with the other adhesives tested, which are deficient in one or more of the properties tested. Moreover, the adhesives herein, employing the combination of different types of chloroprene polymers specified, not only have a unique combination of properties but achieve a degree of low humidity resistance never before obtained with such adhesives.

Other adhesives of the class described have similar advantages over corresponding adhesives of conventional composition. Several such other desirable adhesives, produced using substantially the above procedure, are illustrated below.

EXAMPLE 2

The following were mixed for 4 hours:

| | Parts by wt. |
|---|---|
| Phenolic resin (as in Example 1) | 80 |
| Magnesium oxide (fine particles) | 8 |
| Water | 1 |
| Toluene | 87 |

Using the procedure of Example 1, the above was then mixed with the following:

| | Parts by wt. |
|---|---|
| Neoprene AF | 37.5 |
| Neoprene AC | 37.5 |
| Neoprene W | 25.0 |
| Magnesium oxide | 1 |
| Zinc oxide | 0.5 |
| Di-t-butyl p-cresol | 1 |
| Hexane | 345 |
| Methyl ethyl ketone | 187.5 |
| Toluene | 129 |

The product obtained had excellent properties, with a long bonding range, good heat resistance and high immediate strength.

EXAMPLE 3

In this example a modified phenolic resin was employed; it was made by reacting 8 parts of the phenolic resin used in Example 1 with 1 part of a preformed rosin-phenol resin having a melting point (capillary tube) of 270° F. and an acid number of about 65. This was blended, as follows:

| | Parts by wt. |
|---|---|
| Modified phenolic resin | 87 |
| Magnesium oxide | 6 |
| Water | 1 |
| Toluene | 15 |

After mixing the foregoing for 4 hours, the product was mixed with the following as before:

| | Parts by wt. |
|---|---|
| Neoprene AF | 37.5 |
| Neoprene AC | 37.5 |
| Neoprene W | 25 |
| Magnesium oxide | 1 |
| Zinc oxide | 0.5 |
| Hexane | 275 |
| Methyl ethyl ketone | 149.5 |
| Toluene | 133 |

The adhesive obtained had good properties as described above.

EXAMPLE 4

Useful adhesives are also obtained using a metal resinate along with the mixture of chloroprene polymers, as shown by an adhesive produced by mixing the following for 24 hours in a churn-type mixer:

| | Parts by wt. |
|---|---|
| Zinc resinate [1] | 30 |
| Neoprene AF | 37.5 |
| Neoprene AC | 37.5 |
| Neoprene W | 25 |
| Magnesium oxide | 2 |
| Zinc oxide | 0.5 |
| Di-t-butyl-p-cresol | 1 |
| Hexane | 221 |
| Methyl ethyl ketone | 120.5 |
| Toluene | 138.5 |

[1] "Zirex," 8.9 percent combined zinc, 0.6 percent calcium.

EXAMPLE 5

This example illustrates the use of a phenolic resin in combination with zinc resinate as the resin component. The following were mixed for 4 hours:

| | Parts by wt. |
|---|---|
| Phenolic resin (as in Example 1) | 40 |
| Zinc resinate (as in Example 4) | 30 |
| Magnesium oxide | 7 |
| Water | 1 |
| Toluene | 75.5 |

This mixture was then combined with the following as described above:

| | Parts by wt. |
|---|---|
| Neoprene AF | 37.5 |
| Neoprene W | 25 |
| Neoprene AC | 37.5 |
| Magnesium oxide | 1 |
| Zinc oxide | 0.5 |
| Di-t-butyl-p-cresol | 1 |
| Hexane | 295 |
| Methyl ethyl ketone | 160 |
| Toluene | 105.5 |

The product was a smooth, homogeneous adhesive, having a total solids content of 22.1 percent and a viscosity of 280 centipoises. It had good properties, as described above, and also had excellent peel strength, both at room temperature and at elevated temperatures, such as 160° F.

Still other outstanding adhesives can be made by substituting other chloroprene polymers of the types described for the corresponding neoprene of the examples, or by utilizing other phenolic resins, terpene-phenolic resins and metal resinates for those shown. Other additives, solvents and the like can also be used in place of or in addition to those described.

The adhesives herein can be employed using any conventional bonding method and to bond virtually any surface. While they are particularly desirable when used as contact-bond cements for bonding rigid and semi-rigid materials, such as decorative laminates, linoleum and the like, to desk, counter, and cabinet tops, they are also valuable in bonding a wide variety of skins and both solid and expanded cores in laminated panel construction, and in other bonding processes. Essentially any lamina can be employed in producing laminates with the hereindescribed adhesives.

Among the materials which are advantageously bonded by these compositions to form laminated structures are various metal laminae, including steel, aluminum, stainless steel, anodized aluminum, etched aluminum, zinc coated steel and the like; siliceous, calcareous or other inorganic laminae, such as glass fiber mats, flat glass, foamed glass, porcelain enameled surfaces, asbestos, concrete sheet materials, cement-asbestos board, perlite, vermiculite and similar materials; plastic laminae, including filled or unfilled, naturally-occurring or synthetic materials, such as linoleum, rubber, leather, polyesters, phenolic resins, acrylic resins, melamine resins, epoxy resins, alkyd resins, as well as surfaces coated with such materials; natural or synthetic foamed plastic materials, such as foamed rubber, expanded polystyrene, polyurethane foams, epoxy foams, and the like; and cellulose-containing laminae, such as plywood, wood blocks, fiberboard, hardboard and similar wood materials, as well as paper and paper products, such as paper sheets and honeycomb, and resin-impregnated paper honeycomb.

These adhesive compositions can be applied by roller coating, brushing, spraying, curtain-coating, or by any other method which provides a dried film of suitable thickness. Bonding of materials coated with these adhesives may be carried out by contacting the adhesive coated surfaces at room temperature, whereby a very strong bond is created instantly upon contact of the adhesive coated surface, and this bond continues to build up strength over a period of time. Hot-bonding techniques may also be employed and often have the advantage of eliminating variations in bond strength and providing immediate high strength bonds.

According to the provisions of the patent statutes, there are described above the invention and what are now considered to be its best embodiments. However, within the scope of the appended claims, it is to be understood that the invention can be practiced otherwise than as specifically described.

What is claimed is:
1. An adhesive composition comprising
(A) 100 parts of chloroprene polymer;
(B) from about 10 to about 150 parts of one or more members of the group consisting of
(a) oil-soluble, heat-hardenable phenolaldehyde resins;
(b) reaction products of oil-soluble, heat-hardenable phenol-aldehyde resins with a terpene-phenol resin, said terpene-phenol resin being made from the reaction of a phenol with a terpene; and
(c) a metal resinate selected from the group consisting of zinc resinate, magnesium resinate and lead resinate;
(C) from about 0.5 to about 100 parts of at least one oxide or hydroxide of a metal in Groups I-A, II-A, II-B, or IV-A of the Periodic Table; said 100 parts of chloroprene polymer consisting of
(1) from about 10 to about 70 percent by weight of non-creping chloroprene polymer characterized by being at least partially vulcanized when milled at 212° F. with 5 parts of magnesium oxide per 100 parts of chloroprene polymer;
(2) from about 5 to about 75 percent by weight of non-creping chloroprene polymer characterized by a low softening rate when treated with piperidinium pentamethylene thiocarbamate and a high crystallizing rate after such treatment, and
(3) from about 10 to about 65 percent by weight of non-creping chloroprene polymer characterized by a low softening rate when treated with piperidinium pentamethylene thiocarbamate and a medium crystallizing rate after such treatment.

2. The composition of claim 1 in which (B) is an oil-soluble heat-hardenable resin made from the alkaline-catalyzed reaction of a para-substituted phenol with excess formaldehyde.

3. The composition of claim 1 in which (B) is a reaction product of a rosin-phenol resin and an oil-soluble heat-hardenable phenol-aldehyde resin.

4. The composition of claim 1 in which (B) is a mixture of zinc resinate and an oil-soluble heat-hardenable phenol-aldehyde resin or the reaction product of such a phenol-aldehyde resin with a rosin-phenol resin.

5. The composition of claim 1 in which (B) is a mixture of an oil-soluble, heat-hardenable phenol-aldehyde and a reaction product of such a phenol-aldehyde resin with a rosin-phenol resin.

6. The composition of claim 1 in which (C) is magnesium oxide.

7. An adhesive composition comprising
(A) 100 parts of chloroprene polymer;
(B) from about 10 to about 150 parts of one or more members of the group consisting of
(a) oil-soluble, heat-hardenable phenol-aldehyde resins made from an alkaline catalyzed reaction of a para-substituted phenol with excess formaldehyde,
(b) reaction products of said phenol-aldehyde hyde resins with a rosin-phenol resin, and
(c) zinc resinate; and
(C) from about 0.5 to about 40 parts of at least one oxide or hydroxide of an alkali metal or an alkaline earth metal; said 100 parts of chloroprene polymer consisting of
(1) from about 25 to about 50 percent by weight of chloroprene polymer characterized by being at least partially vulcanized when milled at 212° F. with 5 parts of magnesium oxide per 100 parts of chloroprene polymer;
(2) from about 20 to about 45 percent by weight of chloroprene polymer characterized by a low softening rate when treated with piperidinium pentamethylene thiocarbamate and a high crystallizing rate after such treatment; and
(3) from about 15 to about 40 percent by weight of chloroprene polymer characterized by a low softening rate when treated with piperidinium pentamethylene thiocarbamate and a medium crystallizing rate after such treatment.

8. The composition of claim 7 in which said phenol-aldehyde resin is made from p-tertiary butyl phenol and (C) is magnesium oxide.

9. A laminate comprising a plurality of laminae bonded together by the adhesive composition of claim 1.

10. A laminate comprising a plurality of laminae bonded together by the adhesive composition of claim 7.

11. A laminate comprising a substrate of wood or bound wood particles and a resin-impregnated paper laminate bonded to said substrate by the adhesive composition of claim 1.

12. A laminate comprising a substrate of particle board and a resin-impregnated paper laminate bonded to said substrate by the adhesive composition of claim 7.

References Cited

UNITED STATES PATENTS

| | | | |
|---|---|---|---|
| 3,308,087 | 3/1967 | Garrett | 260—845 |
| 2,058,246 | 10/1936 | McCortney | 260—293.48 |
| 2,741,651 | 4/1956 | Been et al. | 260—27 |
| 3,044,976 | 7/1962 | Brooks et al. | 260—32.8 |
| 3,144,428 | 8/1964 | Kost | 260—845 |
| 3,198,760 | 8/1965 | Widenor | 260—27 |
| 3,242,113 | 3/1966 | Kell | 260—845 |

FOREIGN PATENTS

| | | | |
|---|---|---|---|
| 495,247 | 11/1938 | Great Britain | 260—293.48 |

OTHER REFERENCES

Catton, N., "The Neoprenes" 1953 (copy in group 140) (pp. 201 to 203 relied on).

Lawrence and Fitch, "Processing and Compounding of Neoprene AF," 1964 (copy in group 140) pp. 1 to 15 relied on).

Skeist, I., "Handbook of Adhesive" 1962 (copy in group 140) (pp. 268 to 285 relied on).

DONALD E. CZAJA, Primary Examiner

W. E. PARKER, Assistant Examiner

U.S. Cl. X.R.

161—250, 261, 263; 260—27, 845, 890